2,993,169
Patented July 18, 1961

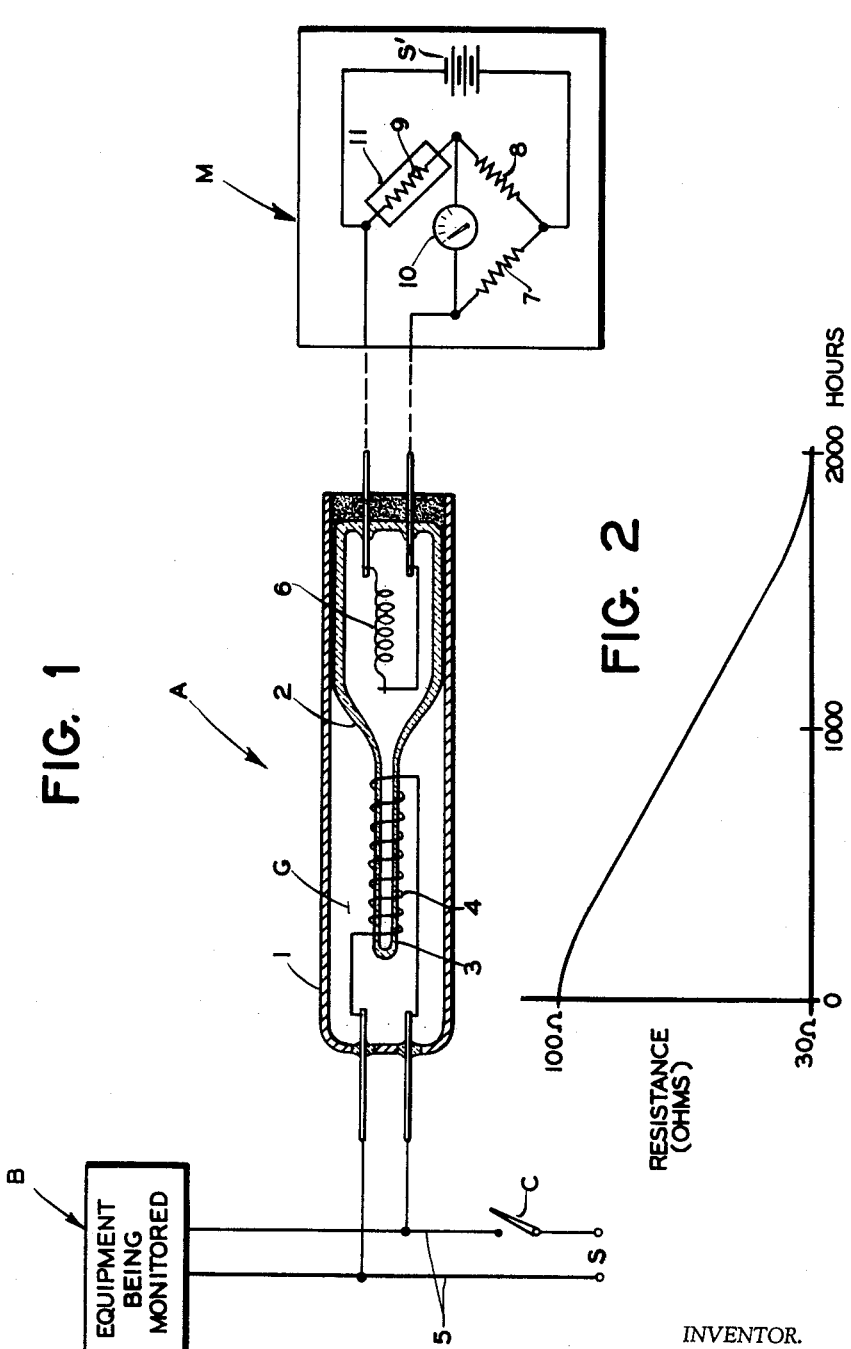

2,993,169
TIMING DEVICE

William R. Polye, River Edge, N.J., assignor to The Bendix Corporation, a corporation of Delaware
Filed May 12, 1958, Ser. No. 734,721
3 Claims. (Cl. 324—68)

The invention relates generally to timing devices and more particularly to devices for indicating the total time equipment has been operated.

Many devices such as vacuum tubes, motors, heating elements, amplifiers, hydraulic actuators, etc. have a predictable time of trouble-free operation and it is desirable to measure the total time such devices are operated to avoid failure of the equipment in which the devices are used. This is especially important when the equipment is used on aircraft where failure of a small device may cause the airplane to crash with loss of life.

One object of the invention is to provide a simple device for measuring the total time equipment is operated and which is small in size, accurate, and reliable and which may have an extended time range of several thousand hours.

Another object is to provide a time sensing device which changes resistance as a function of time of operation and which may be used with a remote indicator.

Another object is to provide a device which integrates time of operation.

The invention contemplates measuring the diffusion of gas through a heated barrier for sensing the time during which a voltage is applied to equipment being monitored. A device using this mode of operation may comprise a diffuser for diffusing gas therethrough when heated by a heating element energized by the voltage, and means for measuring the quantity of gas diffused through the diffuser. The diffused gas may be collected in a chamber and the density of the gas may be determined by measuring the resistance of a resistance means in the chamber.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

In the drawing, FIGURE 1 shows an arrangement constructed according to the invention for indicating the total time equipment has been operated, and FIGURE 2 is a curve showing the relationship of resistance of the resistance means to time of diffusion.

In the drawing, a time sensor A is connected in parallel with equipment B being monitored through a switch C to a power source S to sense the time of operation of the equipment and indicate the elapsed time on an indicating unit M which is connected electrically to sensor A and may be positioned remotely therefrom.

Sensor A comprises a sealed capsule or envelope 1 filled with a suitable gas G to any desired pressure, for example, one atmosphere. An evacuated sealed capsule or chamber 2 is fixedly mounted within capsule 1 and communicates with a diffuser 3 of material suitable for diffusing gas therethrough when heated by a heating element 4 wound thereon. Heating element 4 is connected electrically to power source S in parallel with equipment B, as described above, and is arranged when energized to heat diffuser 3 so that gas G in capsule 1 diffuses through diffuser 3 into capsule 2. The rate at which the gas diffuses from capsule 1 into capsule 2 is governed by the following relation:

$$\ln Q = C - \frac{B}{T}$$

where $\ln Q$ is the natural logarithm of the quantity of gas transferred per unit time per unit area per unit wall thickness per unit pressure difference, B and C are constants involving the materials used, and T is the absolute temperature of the diffuser.

The quantity of gas transferred from capsule 1 into capsule 2 is measured by measuring the thermal conductivity of the gas which is a function of its density. A resistance coil 6, having a high temperature coefficient of resistivity, is mounted in capsule 2 in any suitable manner for this purpose and changes resistance with time of diffusion as shown in FIGURE 2. Coil 6 comprises one leg of a Wheatstone bridge, the other three legs of the bridge being formed by resistors 7, 8 and 9 in indicator unit M. Resistor 9 may be mounted in an evacuated sealed bulb 11 and be identical to coil 6. The bridge is energized by a power source S' (which may be the same as source S) connected between legs 6 and 9 and between legs 7 and 8, and the amount of bridge unbalance is read on meter 10 connected between legs 6 and 7 and between legs 8 and 9 in the conventional manner. The amount of gas diffused from capsule 1 through diffuser 3 into capsule 2 is a function of the resistance of coil 6 which is measured by the Wheatstone bridge and meter 10 measures the amount of unbalance of the Wheatstone bridge and may be calibrated in units of time to indicate directly the total time the equipment is operated. Each time the equipment is used, heater 4 is energized and a quantity of gas is diffused from capsule 1 through diffuser 3 into capsule 2 and it is immaterial whether the operation is continuous or intermittent.

Any suitable combination of gases and diffuser materials may be used, such as hydrogen with palladium, platinum, or copper; oxygen with silver, or helium with glass, but it is important that diffusion of the gas through the diffuser material occur only when the diffuser is heated by heating element 4 and be a minimum when the heating element is deenergized. It has been found that helium used with Pyrex glass operates very satisfactorily at a diffuser temperature of 300 degree centigrade.

A time indicating arrangement constructed according to the invention is simple yet is accurate and reliable for measuring the total time equipment is operated. The resistance of coil 6 changes as a function of time and the device may be used with a remote indicator. The device integrates time of operation.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art. In some instances, it may be advantageous to diffuse gas from chamber 2 through diffuser 3 into chamber 1 and measure the change in resistance of coil 6. In an arrangement of this kind chamber 2 is charged with gas at a predetermined pressure and chamber 1 is evacuated or at some suitable lower pressure than the predetermined pressure.

What is claimed is:

1. A device for sensing the time during which a voltage is applied thereto, comprising a heating element adapted to be energized by the voltage, a diffuser heated by the heating element and diffusing gas therethrough when heated, a chamber in communication with the diffuser and receiving the diffused gas, an envelope filled with the gas at a higher pressure than in the chamber and enclosing the chamber, and means for measuring the quantity of gas diffused from the envelope into the chamber.

2. A device for sensing the time during which a voltage is applied thereto, comprising a pair of chambers, a diffuser, a heating element for heating the diffuser and adapted to be energized by the voltage, a gas under pressure in one of the chambers adapted to be diffused through the diffuser into the other chamber when the diffuser is heated, and means for measuring the quantity of gas diffused through the diffuser.

3. A device for sensing the time during which a voltage is applied thereto, comprising a pair of chambers, a diffuser positioned in one of the chambers and in communication with the other chamber, a heating element for heating the diffuser and adapted to be energized by the voltage, a gas under pressure in one of the chambers adapted to be diffused through the diffuser into the other chamber when the diffuser is heated, and means for measuring the quantity of gas diffused through the diffuser.

References Cited in the file of this patent

UNITED STATES PATENTS

| | | |
|---|---|---|
| 2,214,181 | Rylsky | Sept. 10, 1940 |
| 2,790,324 | Babb | Apr. 30, 1957 |